United States Patent [19]
Drewett

[11] 3,995,437
[45] Dec. 7, 1976

[54] SHOCK ABSORBING ARRANGEMENT FOR A MARINE STRUCTURE

[76] Inventor: Glen E. Drewett, P.O. Box 52627, Lafayette, La. 70501

[22] Filed: June 9, 1975

[21] Appl. No.: 585,427

[52] U.S. Cl. .................................. 61/86; 61/48; 114/219; 267/140
[51] Int. Cl.[2] ............... E02B 3/20; B60R 19/08
[58] Field of Search ............... 61/48, 46; 114/219, 114/220; 267/139, 140

[56] References Cited
UNITED STATES PATENTS

| | | | |
|---|---|---|---|
| 3,235,244 | 2/1966 | Hein | 267/1 |
| 3,555,832 | 1/1971 | Narabu | 61/48 |
| 3,763,653 | 10/1973 | Shirvany | 61/48 |
| 3,819,167 | 6/1974 | Nakamura | 267/139 |

Primary Examiner—Jacob Shapiro
Attorney, Agent, or Firm—Jack W. Hayden

[57] ABSTRACT

A shock absorbing arrangement for marine structures includes an annular elongated hollow body with an elastomer body molded adjacent one end of the annular body, the elastomer body having a plurality of circumferentially spaced voids therein extending from one end of the body and terminating in spaced relation relative to the other end of the body. A cylinder is molded in the center of the body and has an open end facing in the same direction as the open end of the voids and a closed end adjacent but spaced from the other end of the elastomer body and the elastomer body is provided with an enlargement adjacent the closed cylinder end to serve as a shock absorber and bumper.

4 Claims, 3 Drawing Figures

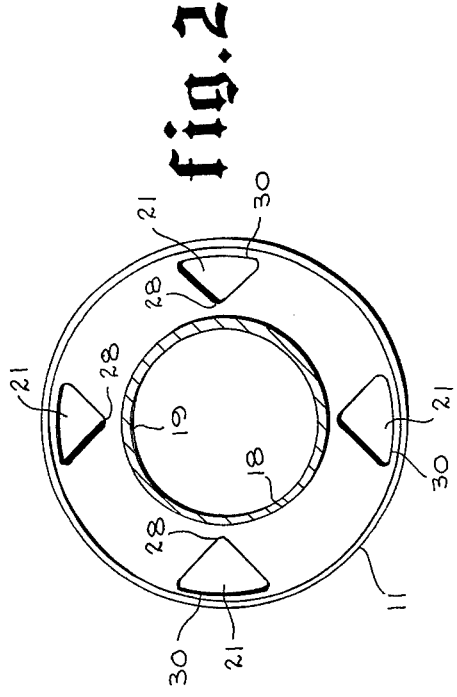
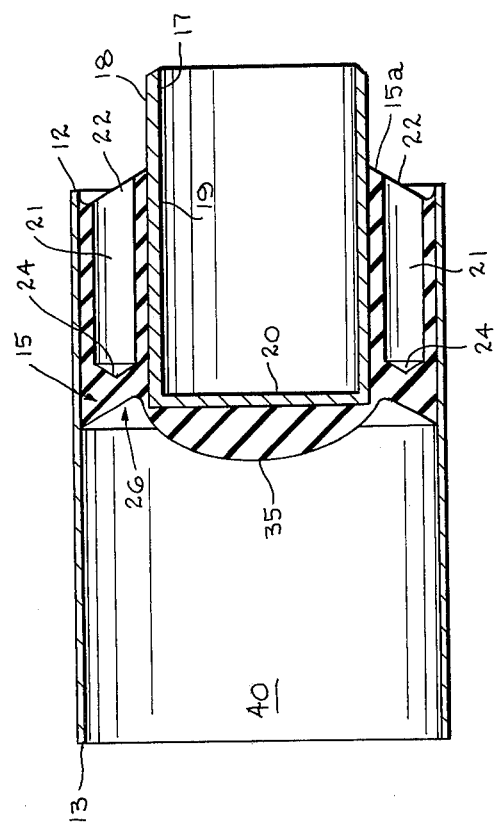
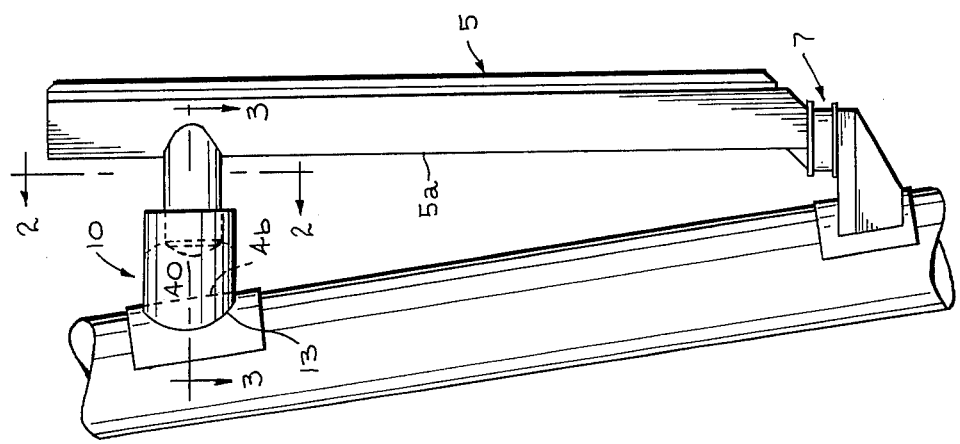

SHOCK ABSORBING ARRANGEMENT FOR A MARINE STRUCTURE

SUMMARY OF THE INVENTION

Various devices have been proposed and are in use in association with marine structures to serve as shock absorbing arrangements when barges, boats or other marine vessels engage such structures. In some instances a great deal of difficulty is encountered with shock absorbing arrangements presently in use due to the impact loading thereof upon engagement by a marine vessel with the structure.

The present invention is constructed and arranged in a manner to inhibit tearing, or damage to the shock absorbing arrangement upon impact loading thereof when contacted by marine vessels.

Still another object of the present invention is to provide a shock absorbing arrangement including an annular hollow body having an elastomer body molded adjacent one end thereof, said elastomer body including a plurality of circumferentially spaced voids open at one end of said elastomer body and terminating in spaced relation relative to the other end of the elastomer body with a cylinder molded centrally of said body and having an open end facing in the same direction as the open end of the voids and a closed end in the elastomer body.

Still another object of the present invention is to provide a shock absorbing arrangement including an annular hollow body having an elastomer body molded adjacent one end thereof, said elastomer body including a plurality of circumferentially spaced voids open at one end of said elastomer body and terminating in spaced relation relative to the other end of the elastomer body with a cylinder molded centrally of said body and having an open end facing in the same direction as the open end of the voids and a closed end in the elastomer body and said elastomer body having an enlargement adjacent the closed end of the cylinder of a generally hemispherical configuration.

Still another object of the present invention is to provide a shock absorbing arrangement for a marine structure having an elastomer body functioning as a shock absorber which is constructed and arranged to tend to reduce damage or tearing of the shock absorbing arrangement upon impact.

Still a further object of the present invention is to provide a shock absorbing arrangement which is constructed and arranged so that during fabrication thereof, a more uniform cure of the elastomer body forming part of the configuration may be obtained, and which is also constructed and arranged so as to place the elastomer body in a more uniform shear during functioning thereof.

Other objects and advantages of the present invention will become more readily apparent from a consideration of the following drawings and description.

BRIEF DESCRIPTION OF THE DRAWINGS

FIG. 1 is a partial elevational view showing a structure leg of an offshore or marine structure with a bumper guard secured thereto and with the shock absorbing invention of the present invention positioned between the bumper guard and the structure leg;

FIG. 2 is a sectional view on the line 2—2 of FIG. 1 illustrating the preferred configuration and arrangement of the circumferential voids in the elastomer body and the relationship of the elastomer body to the annular hollow body in which the elastomer body is molded as well as the cylindrical body positioned generally centrally of the elastomer body;

FIG. 3 is a sectional view on the line 3—3 of FIG. 1 to more clearly illustrate the structural details and preferred arrangement of the present invention.

DESCRIPTION OF THE PREFERRED EMBODIMENT

Attention is first directed to FIG. 1 of the drawings wherein a portion of a structure leg of an offshore structure or marine structure is represented generally by the numeral 4. It can be appreciated that the lower end of such leg is positioned in a water covered area with the upper leg extending thereabove to serve as a suitable support for a deck or platformm in the water covered area. It can also be appreciated that a plurality of such legs are provided to accomplish such purpose.

A bumper guard is illustrated generally by the numeral 5 and is shown as extending generally in a vertical direction which serves as a protection to inhibit damage to the structure leg 4, or to a marine vessel as such vessel approaches the offshore structure. The lower end of the bumper guard 5 is supported by any suitable arrangement generally illustrated at 7, and the present invention referred to generally at 10 is positioned adjacent the upper end of the bumper guard between the structure leg and the bumper guard.

As more clearly shown in FIGS. 2 and 3, the present invention includes an annular elongated hollow body 11 having ends 12 and 13 thereon. It can be appreciated that the end 13 is suitably configured to be received on the jacket leg 4 in any manner well known in the art. An annular elastomer body referred to generally at 15 is molded within and adjacent the end 12 of the annular hollow body 11 such elastomer body 15 having molded in the central portion thereof a cylinder 18 including the cylindrical wall 19 and the closed end 20. The cylinder 18 extends lontiduinally of the body 15 and one end projects beyond the end 15a of the elastomer body while the other end 26 is disposed within the body 11.

Additionally the elastomer body 15 includes a plurality of circumferentially spaced voids 21 molded therein having an open end 22 facing in generally the same direction as the open end 17 of the cylinder 18. The other end 24 of each of the voids is spaced from the end referred to generally at 26 of the elastomer body 15 as more clearly shown in FIG. 3 of the drawings.

Also, the voids 21 are preferably generally triangular shaped as more clearly seen in FIG. 2 of the drawings with the apex 28 of the triangle being disposed adjacent the outer surface of the cylindrical wall 19 of the cylinder 18 and with the base 30 of the triangle being disposed adjacent the annular hollow body 13.

The open end 17 of the cylinder 18 may be suitably configured so as to be secured to the support 5a of the bumper guard 5 in any manner well known in the art such as by welding or the like.

The configuration of the voids eliminates a mass of elastomer material adjacent the annular hollow body 11 so that in effect the circumference of the elastomer body 15 adjacent the cylinder 18 is approximately the same as the circumference of the elastomer body adjacent the annular hollow body 11. While it is true that a small portion of rubber or elastomer is present between the base 30 of the voids 21 and the hollow body 11, the mass of rubber between the voids 21 is the controlling factor in the functioning of the present invention so that the mass of rubber between the cylinder 18 and the hollow body 11 between the voids functions in a desired manner to reduce damage to the elastomer body upon contact by a vessel or the like.

In addition, the voids enable the elastomer body to be provided with a more uniform cure during molding operations as suitable heat may be applied to the elastomer body within the recesses or voids 21.

The construction and arrangement of the elastomer body and its relationship to the hollow body 11 and cylinder 18 enable an increased travel of the device of the present invention upon impact loading without damage to or shearing of the elastomer body as may be present with prior art devices having a solid elastomer body.

In addition, the elastomer body 15 is provided with an enlargement 35 shown as being of a generally hemispherical configuration. Such mass of rubber serves as a shock absorber for engaging the portion 4b of the structure leg, should movement of the shock absorbing arrangement occur to this extent.

Also, the void 40 between elastomer body 15 and structure leg 4 is sealed off thereby inhibiting entrance of moisture or water vapor which would cause corrosion.

The foregoing disclosure and description of the invention are illustrative and explanatory thereof, and various changes in the size, shape, and materials as well as in the details of the illustrated construction may be made without departing from the spirit of the invention.

What is claimed is:

1. A shock absorbing arrangement for marine structures comprising:
   a. an annular, elongated hollow body;
   b. an elastomer body molded in said hollow body adjacent one end thereof;
   c. a cylinder molded centrally of and extending longitudinally of said elastomer body;
   d. said cylinder having one end projecting beyond one end of said elastomer body and having a closed end positioned in spaced relation to and adjacent the other end of said elastomer body;
   e. said elastomer body having a plurality of voids circumferentially spaced about said cylinder, said voids each having an open end facing toward the cylinder end which projects beyond said one elastomer end and terminating in spaced relation to the other end of said elastomer body to form a closed end on said void; and
   f. said voids having a configuration so that the circumference of said elastomer body between adjacent voids and adjacent said cylinder approximates the circumference of said elastomer body between adjacent voids and adjacent said annular, hollow body.

2. The invention of claim 1 wherein said elastomer body is provided with an enlargement centrally disposed on said other end.

3. The invention of claim 1 wherein said circumferential spaced voids are generally triangular in configuration with the apex of the triangle adjacent said cylinder and the base of said triangle adjacent said annular, hollow body.

4. The invention of claim 2 wherein said enlargement is generally hemispherical in configuration.

* * * * *